Oct. 26, 1954     E. HARTZELL ET AL     2,692,461
UNIVERSAL TOOL CONTROL HEAD
Filed June 5, 1952
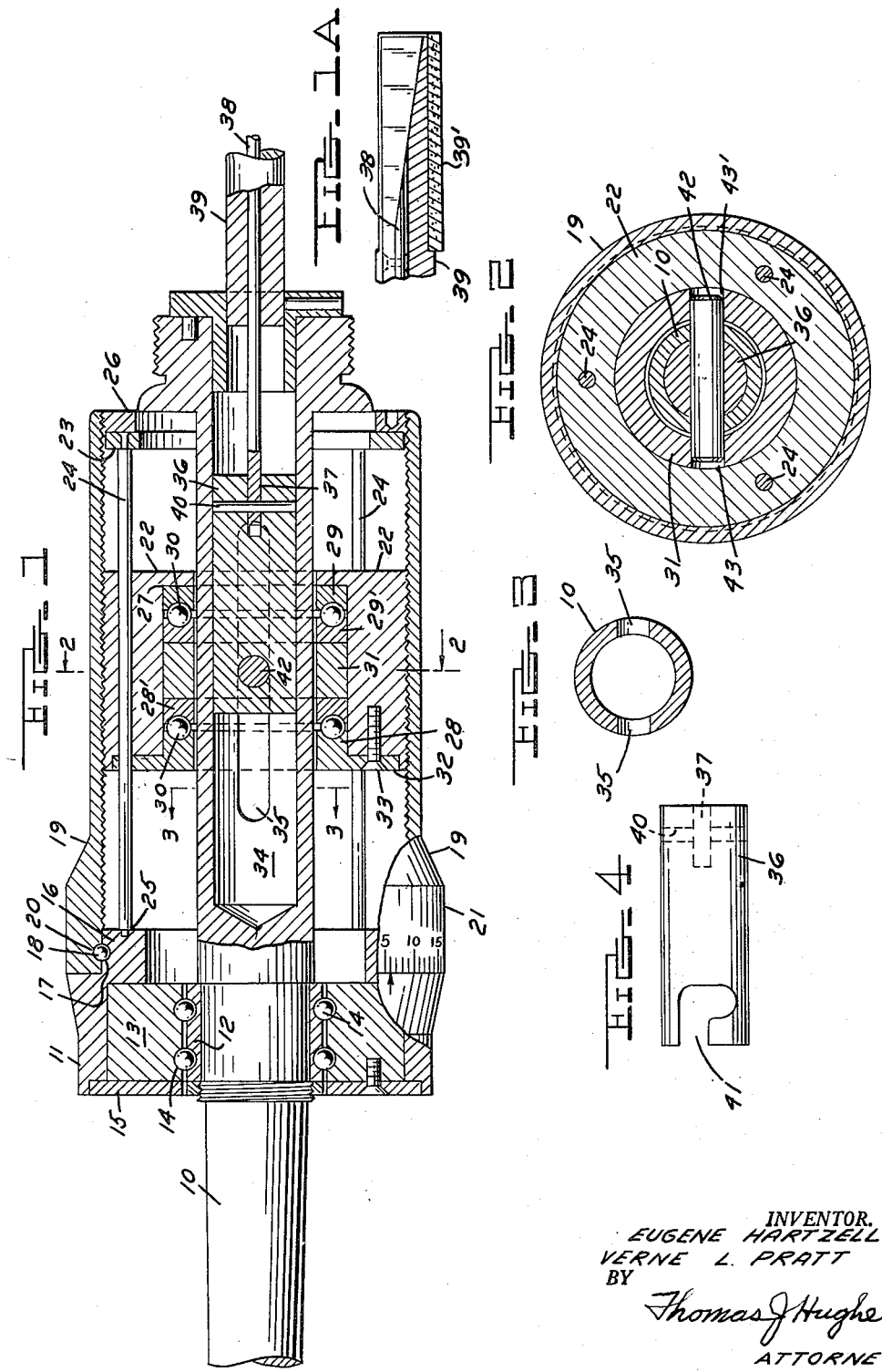
INVENTOR.
EUGENE HARTZELL
VERNE L. PRATT
BY
Thomas J Hughes
ATTORNEY Patented Oct. 26, 1954

2,692,461

UNITED STATES PATENT OFFICE 2,692,461

UNIVERSAL TOOL CONTROL HEAD

Eugene Hartzell, Royal Oak, and Verne L. Pratt, Detroit, Mich.

Application June 5, 1952, Serial No. 291,899

2 Claims. (Cl. 51—184.3)

This invention relates to a universal control head for use in controlling the position of tools in relation to the bores of work pieces, particularly honing, reaming, boring and grooving tools, whether such tools are actuated in a lathe, drill press, screw machine or any of the present types of machines using such tools.

An object of the present invention is to provide a head having a driven shaft therein adapted to be coupled at one end to a source of power and through its other end to a tool whereby upon manual rotation of the head, either while the tool is at rest or during rotation thereof, the cutting or abrading element of the tool may be radially expanded to maintain said element in intimate contact with the work so as to assure efficient, rapid and accurate removal of the stock to reduce the work to its desired size.

Another object of the invention is to provide a universal head for a tool whereby the cutting or abrasive portion of the tool may be pushed or pulled forwardly or backwardly relative to the work while the tool is rotating, thus obviating any necessity for stopping the mechanism for any readjustments or repositioning of the tool to expand it into contact with the work.

Another object of the invention is to provide a universal head for controlling the expansion of the abrasive portion of a tool to move it longitudinally through cylindrical blind end bores while the tool is rotating and in such control of the abrasive the latter can be brought into intimate contact with the corners or shoulders of the blind end to hone the walls of the work to effect the precise honing of the shoulders.

The above other and further objects of the present invention will be apparent from the following description, accompanying drawing and appended claims.

The accompanying drawing illustrates the embodiment of my control head constructed in accordance with the principles of the present invention and the views thereof are as follows:

Figure 1 is a sectional view through the control head embodying features of my invention, Fig. 1A is a vertical section of the cutting or abrading tool employed in my device.

Figure 2 is a sectional view of the structure illustrated in Fig. 1, taken on the line 2—2 thereof.

Figure 3 is a sectional view of the driven shaft taken on the line 3—3 of Fig. 1, and Figure 4 is a side elevation of the tool adapter shown centrally of Fig. 1.

Referring to the drawings, 10 is a driven shaft which is adapted to be coupled to a source of power such as provided by a lathe, drill press or screw machine (not shown). The shaft is rotatably supported in a sleeve retaining member generally indicated by the numeral 11 and wherein the member is provided with the inner and outer ball races 12 and 13 respectively for retaining the balls 14 to enable the shaft to rotate within the member. A face plate 15 is secured to race 13 to hold the races and balls in position. Member 11 is provided in its forward portion with an annular shoulder 16, the outer central part of which is provided with an annular race 17 to receive a plurality of balls 18.

An adjusting sleeve 19, having a race 20 cooperating with race 17 to receive the balls 18, is fitted to the shoulder 16 whereby the sleeve may be manually rotated relative to the shaft 10 about the said shoulder. Balls 18 are inserted in raceways by the old and well known method of tapping a hole through from the outer surface of sleeve 19 to said raceway, inserting the balls through said hole (not shown), and then closing the hole by means of a set screw to retain the balls in said raceway. Annularly about the outer face of said sleeve, adjacent the member 11, I provide a scale of graduations 21, reference to which will be made hereinafter.

The major portion of the interior surface of sleeve 19 is threaded for engagement with an exteriorly threaded nut 22 whereby, upon manual rotation of sleeve 19, the nut 22 may be moved longitudinally of the sleeve either forward or backward therein. To assure against any rotation whatsoever of nut 22, I provide a cage 23 which carries a plurality of elongated arms 24 that extend through nut 22 with the outer ends of the arms snugly nested in seats 25 of the retaining member 11. The cage 23 is then locked in position by retention plate 26 threadedly secured in the outer end of sleeve 19. It will be understood that in addition to restraining nut 22 from rotation, the arms 24 provide means for slidably guiding the nut in its longitudinal backward and forward movement aforesaid.

The nut 22 is provided with a bore 27 for the reception of a plurality of annular or ring shaped elements presently to be described. These elements consist of a dual pair of ball races, each pair being respectively designated 28 and 28' and 29 and 29', and disposed in each pair of races are the balls 30. Intermediate the inner races 28' and 29' I dispose the remaining element which is a tool expansion control member 31. To positionally retain said elements within the nut 22 I provide a closure plate 32 which is secured to said nut by bolts 33. The purpose of so assembling the aforesaid elements interiorly of the nut is to enable the control member 31 to be rotated therein as hereinafter will be described more particularly.

Shaft 10 has a bore 34 extending a substantial distance inwardly from its outer end and midway of the ends of the bore a pair of opposed parallel slots 35 are provided through the walls thereof. It will be understood that shaft 10 passes centrally through the aforesaid elements 28—28', 29—29' and 31 so that its horizontal axis (Fig. 1) is transverse to the horizontal axis of said elements and that the slots 35 are so disposed that they are adjacent such elements.

Within the bore 34 I insert an adapter 36 (Figs. 1 and 4), the outer end of which has a bore 37 for receiving the inner end of a tool control rod 38 that is carried by the tool 39, the outer end of which carries a cutting or abrading element 39' securely fastened in any well known manner to the rod 38. The rod 38 is secured to the aforesaid adapter by any well known means, such as for instance pin 40.

The inner end of adapter 36 is provided with a bayonet slot 41 which slot is intended for engagement with the tool control pin 42. The latter (Figs. 1, 2 and 3) is disposed so that it extends through the control member 31, shaft 10 and adapter 36. Specifically the opposed ends of pin 42 seat in the slots 43—43' of control member 31 while the interior portion of pin 42 is engaged through the slots 35 of shaft 10 and the bayonet slot 41 of adapter 36. Thus, when shaft 10 is rotated it will rotate therewith the control member 31 within the nut 22, as previously referred to above. It will be understood that although nut 22 is not in any manner affected by the rotation of the control member 31 therein that said nut may be freely slid longitudinally of the shaft 10 upon manual rotation of the sleeve 19 and that such longitudinal movement may be made while the shaft is rotating.

In the operation of my universal control head, as hereinabove described, after the tool 39 is attached to the shaft 10 and the control rod 38 is connected through the adapter 36 and control pin 42 to the control member 31, the assembly is ready to perform its cutting or honing operations. The diameter of the bore in the work piece being known the tool 39, which carries the abrasive or cutting element at its outer end is inserted into the bore of the work piece and the sleeve 19 is then rotated to bring the cutting tool or abrasive into contact with the work piece to be acted upon. The contact of the cutter or abrasive with the work piece is effected when, through the rotation of sleeve 19 either to the right or left, nut 22 is likewise moved thereby either to the right or left. In such movement the control member 31 moves in the same direction with the nut and because member 31, through its connection with pin 42 and adapter 36 and the latter's connection to the control rod 38, as aforesaid, such movement of the control member results in either pulling or pushing said control rod longitudinally of the work piece so that the abrasive or cutting tool actuated by the said rod can be expanded into honing or cutting relationship with the work. The graduations 21 on sleeve 19 permit adjustment expansion of the hone or cutting tool of .00005 per graduation so that the operator is enabled thereby to readily determine the precise adjustment necessary to expand the cutting tool or hone to attain through its rotation the finished surface required.

We claim:
1. The combination with a driven shaft having a cutting tool mounted therein for rotation therewith, of a universal control head comprising, a sleeve retaining member rotatably supporting the shaft therein, an externally threaded nut slidably disposed about the shaft, a cage member having a plurality of arms extending through the nut into the retaining member to hold the nut against rotation with the shaft, a tool expansion control member rotatably mounted within said nut, means connecting the control member with the tool, and an adjusting sleeve rotatably mounted on the retaining member encompassing and threadedly engaging said nut for selectively sliding the nut and its control member longitudinally of the shaft irrespective of the rotation of the latter.

2. In a device for adjusting the operative relationship of the abrading elements of a tool, the combination of a driven shaft, an abrading tool mounted in one end of the shaft for rotation therewith, a nut encircling said shaft, a tool expansion control member rotatably mounted within said nut, an adapter axially disposed in said nut and member, means connecting the control member and adapter with the shaft for rotating that member and adapter with the shaft, a tool control rod having one end in fixed engagement in said adapter and its opposite portion in slidable engagement in said tool, a sleeve retaining member rotatably supported on the shaft, an adjusting sleeve rotatably mounted on the retaining member encompassing and threadedly engaging said nut for selectively sliding the nut, control member, adapter and rod as a unit longitudinally of the shaft irrespective of the rotation of the latter, and a cage member having a plurality of arms extending through said nut into the retaining member to hold the nut against rotation with the shaft.

References Cited in the file of this patent

UNITED STATES PATENTS

| Number | Name | Date |
|---|---|---|
| 1,832,635 | Johnson | Nov. 17, 1931 |
| 1,854,251 | Floss | Apr. 19, 1932 |
| 2,286,360 | Gjertsen | June 16, 1942 |

FOREIGN PATENTS

| Number | Country | Date |
|---|---|---|
| 106,549 | Australia | Feb. 1, 1939 |